United States Patent [19]

Oana

[11] Patent Number: 4,709,990

[45] Date of Patent: Dec. 1, 1987

[54] METHOD OF MANUFACTURING A COLOR-MATRIX-TYPE LIQUID CRYSTAL DISPLAY DEVICE

[75] Inventor: Yasuhisa Oana, Yokohama, Japan

[73] Assignee: Kabushiki Kaisha Toshiba, Tokyo, Japan

[21] Appl. No.: 709,666

[22] Filed: Mar. 8, 1985

[30] Foreign Application Priority Data

Mar. 8, 1984 [JP] Japan .................................. 59-42930

[51] Int. Cl.⁴ ............................................. G02F 1/133
[52] U.S. Cl. .................................. 350/339 F; 350/317
[58] Field of Search ............... 350/339 F, 339 R, 334, 350/317; 428/935, 927, 1; 427/96, 82; 340/703; 252/586

[56] References Cited

PUBLICATIONS

"Multicolor Graphic LCD ...", by Suginoya et al, pp. 206–209, displays 83, 10/4/83.

*Primary Examiner*—Arthur G. Evans
*Attorney, Agent, or Firm*—Banner, Birch, McKie & Beckett

[57] ABSTRACT

An active matrix substrate with a matrix of picture element units each including a switching element and a transparent display electrode is immersed in an emulsion containing coloring matter. The switching elements are electrically controlled in order to supply voltages to selected display electrodes. The selected display electrodes are colored with coloring matter by electrodeposition, with the result that self-aligned color filter layers are formed directly onto the selected display electrodes.

19 Claims, 7 Drawing Figures

METHOD OF MANUFACTURING A COLOR-MATRIX-TYPE LIQUID CRYSTAL DISPLAY DEVICE

BACKGROUND OF THE INVENTION

This invention relates to a method of manufacturing liquid crystal display devices and in particular to a method of manufacturing a color-matrix-type liquid crystal display device having self-aligned color filters formed on an active matrix substrate.

The commonly known technique for coloring a matrix liquid crystal display device is to use color filters. This may be done, for example, by arranging color filters with coloring regions in the form of a regularly repeating sequence of stripes or dots that are separately applied and are of the three additive primary colors (red, green and blue). Generally, a matrix-type liquid crystal display (LCD) device comprises a matrix substrate having a plurality of display electrodes, a counter substrate spaced from the matrix substrate, and liquid crystal filling the space between the two substrates. Color filters, in a conventional matrix-type LCD, are arranged in the counter substrate, i.e., they are manufactured independently from the matrix substrate before assembly of the display device. An electrodeposition method for manufacturing stripe-type color filters is described in M. Suginoya et al. "Multicolor Graphic LCD with Tri-Colored Layers Formed by Electrodeposition," *Japan Display* '83 pages 206–209, Oct. 4, 1983. Since there is necessarily a space between the display electrodes (on the matrix substrate) and the color filters (on the counter substrate), the space being necessary for filling with liquid crystal, such an LCD produces color misalignment due to parallax. It is also very difficult, during assembly of such a device, to precisely align each display electrode and the corresponding color filter.

In order to overcome these drawbacks, it has been proposed to form dot-type color filters directly on each display electrode on the matrix substrate, using a printing technique (see, for example, Japanese Patent Application No. 56-140324 (kokai)). However, a printing technique involving sublimation transfer by heating or evaporation causes color misalignment or undesirably mixed colors, especially when it is used for production of LCD's having a large area or a large number of tiny picture elements.

SUMMARY OF THE INVENTION

An object of the invention is to provide a method of manufacturing a color-matrix-type liquid crystal display device which is suitable for producing an LCD that has a large area or a large number of tiny picture elements without color misalignment or color mixing.

Another object of the invention is to manufacture an LCD in which no color misalignment due to parallax is present.

Another object of the invention is to produce an LCD in which color misalignment does not occur during the process of assembling the device.

The invention is a method of manufacturing a color-matrix-type LCD having an active matrix substrate, that is, a substrate in which it is possible individually to switch each colored dot of the dot matrix. In an active matrix substrate, each picture element unit includes a switching element and a display electrode. Formerly, the switching elements were activated only during a displaying operation. The invention, however, utilizes them also during the manufacturing process.

The active matrix substrate is immersed, as one electrode, into an emulsion containing coloring matter for electrodeposition. Then voltages are supplied to selected display electrodes by controlling the corresponding switching elements so as to form electrodeposited filter layers *directly onto* the selected display electrodes. After removing the active matrix substrate from the emulsion, it is cured. These steps are repeated for each color (red, green, blue).

Thus, self-aligned color filters can be obtained, without color misalignment, and irrespective of the size of the matrix or the size of each individual display electrode. Furthermore, the density (thickness) of the color filters may be controlled simply by controlling the voltages being supplied to the display electrodes. This makes it possible to vary the densities of color filters within a single LCD to compensate for differences in the amount of light passing through different display electrodes. Also, dot-matrix color filters can be easily manufactured by this electrodeposition process regardless of the colors.

DETAILED DESCRIPTION OF PREFERRED EMBODIMENT

Figure 1:
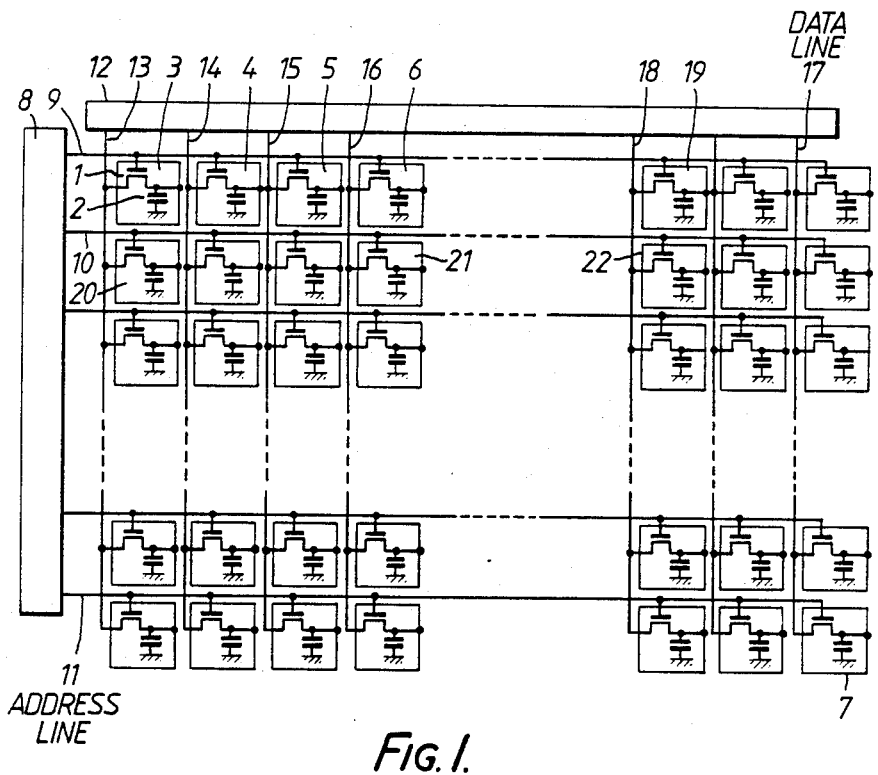
FIG. 1 is an equivalent circuit of an active matrix substrate having a plurality of unit display pixels (defined below) used in the preferred embodiment of the invention.

FIG. 1 shows an equivalent circuit diagram of an active matrix substrate used in a preferred embodiment according to this invention. The active matrix substrate includes a plurality of unit display pixels arranged in an n×m matrix. Each unit display pixel, in the preferred embodiment, consists of three contiguous picture element units in a single row of the matrix. Each picture element unit includes a switching element of, for example, an N-channel enhancement MOSFET, a capacitor for storing a display drive voltage, and a transparent display electrode made, for example, of ITO (Indium-Tin-Oxide). The picture element unit in the upper-left corner in FIG. 1, for example, has a transistor 1, capacitor 2 and display electrode 3. Thus, successive electrodes 3, 4, 5 form one unit display pixel. However, a unit display pixel may be formed, for example, by electrodes 3, 4 and 20. In any event, at least one display electrode of each unit display pixel must be colored in one of the selected colors (red, blue and green, in the preferred embodiment) by the method described below.

Each picture element unit in a row of the matrix is connected to a common address line. Each picture element unit in a column of the matrix is connected to a common data line. For example, the gates of all transistors in the first row of the matrix are connected to address line 9, and the gates of all transistors in the second row are connected to address line 10. The drains of all transistors in the first and second columns of the matrix are connected, respectively, to data lines 13 and 14.

If each display electrode of the active matrix substrate described above has been colored by the method described below, a color image will be displayed as follows. An address drive circuit 8 supplies a high level voltage successively to each address line 9, 10, ... 11. Simultaneously, a data drive circuit 12 supplies an entire row of data, of the color image being displayed, to data lines 13, 14, 15, 16 ..., in response to the selection of address lines by address drive circuit 8. For example, when the first address line 9 is driven high, the first-row data of the color image is supplied to all data lines. The high level voltage on address line 9 causes each transistor in the first row in the matrix to conduct, so that the first-row data is stored in the capacitors of the first row of the matrix. The voltage of each capacitor will be used for controlling the amount of red, blue and green light passing through the liquid crystal so as to display a colored dot image.

Figure 2:
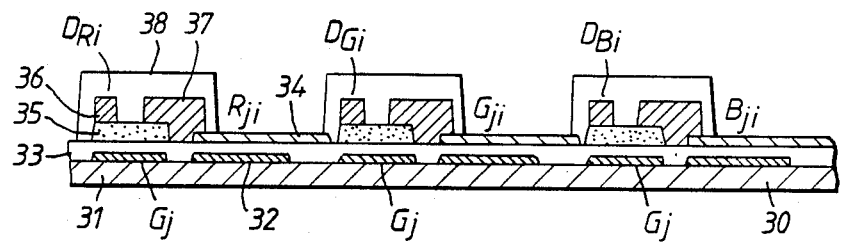
FIG. 2 is a sectional view, in side elevation, of an individual unit display pixel on an active matrix substrate.

FIG. 2 shows a vertical sectional view of the active matrix substrate indicating a unit display pixel located i-th row and j-th column of the matrix. Each picture element unit has the same configuration formed on a transparent glass substrate 30. At first, a gate electrode 31 constituting the gate of the transistor and an ITO electrode 32 constituting one plate of the capacitor are formed on the glass substrate 30. An $SiO_2$ film 33 is formed by chemical vapor deposition (CVD) on gate electrode 31 and ITO electrode 32, serving as both the gate insulator and the capacitor dielectric. Display electrode 34, also made of transparent ITO, is formed on film 33 directly over ITO electrode 32 so as to serve as the other plate of the capacitor. Amorphous silicon layer 35, forming the channel, is also deposited on film 33, directly over gate electrode 31. Drain electrode 36 and source electrode 37 are formed on amorphous silicon layer 35 to complete the switching transistor. Part of source electrode 37 is formed on display electrode 34 in order to connect the two electrically. Finally, a passivation film 38 which insulates various electrodes is provided over the entire surface *except* for the major portion of display electrode 34.

Figure 3:
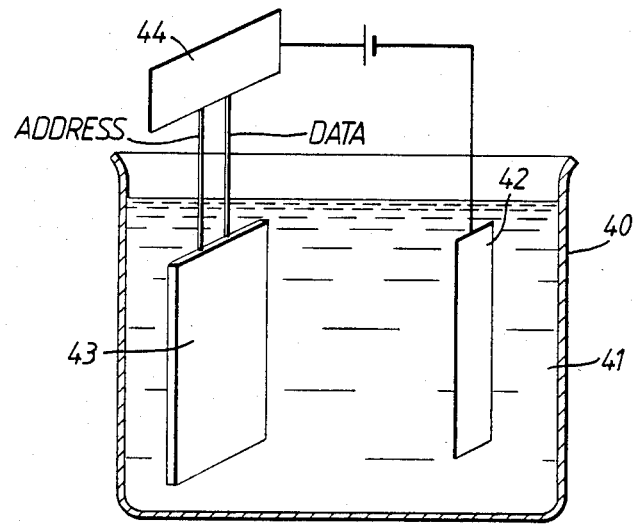
FIG. 3 shows an electrodeposition apparatus used to form color filters on the display electrodes in the preferred embodiment of the invention.

FIG. 3 shows an electrodeposition apparatus which may be used to form color filters on the display electrodes of the above active matrix substrate, in the preferred embodiment of the invention. An electrodeposition tub 40 is filled with electrodeposition emulsion 41 which is a mixed emulsion containing a solution of polyester-melamine resin and a non-water-soluble dye dispersed in water. The above active matrix substrate, as one electrode 43, is immersed in the emulsion 41. Electrode 43 is the one which is to be subjected to electrodeposition. Also, a counter electrode 42, consisting of stainless steel, is immersed so as to face the display electrodes of the active matrix substrate. Both electrodes 42 and 43 are coupled to a DC voltage source of, for example, 15 v through a switching circuit 44. Switching circuit 44, which functions as both address drive circuit 3 and data drive circuit 12, selects address lines and data lines of the active matrix substrate to designate display electrodes on which color filters or electrodeposited layers should be formed. It is preferable for electrode 43 to have a higher potential relative to counter electrode 42 when using an anionic dye as a coloring matter. Examples of suitable dyes are Perylene (trade name) for red and Cu-Phthalocyanimes (trade name) for green and blue (manufactured by Sumitomo Kagaku Co.).

In order to clarify the selection of display electodes by switching circuit 44, the following notations are used hereafter.

$R_{ji}$: indicating one of the display electrodes of the j-th row and i-th column unit display pixel being colored red $G_{ji}$: indicating one of the display electrodes of the j-th row and i-th column unit display pixel being colored green $B_{ji}$: indicating one of the display electrodes of the j-th row and i-th column unit display pixel being colored blue $DR_i$: indicating the data line or drain electrode to which each picture element unit having display electrodes $R_{ij}$ is commonly connected $DG_i$: indicating the data line or drain electrode to which each picture element unit having display electrodes $G_{ij}$ is commonly connected $DB_i$: indicating the data line or drain electrode to which each picture element unit having display electrodes $B_{ij}$ is commonly connected, and $G_j$: indicating the j-th address line or (three)/gate electrodes of the i-th column unit display pixel (i=1, 2 .. . m; J=1,2 ..., N First, red filter layers are electrodeposited on display electrodes $R_{II}, \ldots, R_{Im}, \ldots, R_{nm}$ of active matrix substrate 43. After active matrix substrate 43 is immersed in electrodeposition tub 40 filled with an emulsion containing a solution of polyester-melmine resin and Perylene (trade name) dispersed in water, switching circuit 44 supplies predetermined voltages to address lines and data lines as shown in the first row of Table 1, to select display electrodes $R_{II}, \ldots, R_{Im}, \ldots, R_{nm}$.

TABLE 1

| Coloring Matter Deposited | Electrodes to be Colored | Potentials | |
|---|---|---|---|
| | | Address Lines | Data Lines |
| red | $R_{Il}, \ldots, R_{Im}$ | $G_1, G_2, \ldots, G_n = 15\,V$ | $D_{R1}, D_{R2}, \ldots, D_{Rm} = 15\,V$ |
| | $R_{Il}, \ldots, R_{Im}$ | | $D_{G1}, D_{G2}, \ldots, D_{Gm} = 0\,V$ |
| | $R_{nl}, \ldots, R_{nm}$ | | $D_{B1}, D_{B2}, \ldots, D_{Bm} = 0\,V$ |
| green | $G_{Il}, \ldots, G_{Im}$ | $G_1, G_2, \ldots, G_n = 15\,V$ | $D_{R1}, D_{R2}, \ldots, D_{Rm} = 0\,V$ |
| | $G_{Il}, \ldots, G_{Im}$ | | $D_{G1}, D_{G2}, \ldots, D_{Gm} = 15\,V$ |
| | $G_{nl}, \ldots, R_{nm}$ | | $D_{B1}, D_{B2}, \ldots, D_{Bm} = 0\,V$ |
| blue | $B_{Il}, \ldots, B_{Im}$ | $G_1, G_2, \ldots, G_n = 15\,V$ | $D_{R1}, D_{R2}, \ldots, D_{Rm} = 0\,V$ |
| | $B_{Il}, \ldots, B_{Im}$ | | $D_{G1}, D_{G2}, \ldots, D_{Gm} = 0\,V$ |

TABLE 1-continued

| Coloring Matter Deposited | Electrodes to be Colored | Potentials | |
|---|---|---|---|
| | | Address Lines | Data Lines |
| | $B_{n1}, \ldots, B_{nm}$ | | $D_{B1}, D_{B2}, \ldots, D_{Bm} = 15$ V |

That is, supplying 15 V to all the address lines, switching circuit 44 supplies 15 V selectively to data lines $D_{R1}, D_{R2}, \ldots, D_{Rm}$. The remaining data lines are kept at 0 V. The thickness of red coloring matter deposited on the selected display electrodes depends on the voltage being applied to the selected display electrodes, so that about 1 um of thickness was given by the above voltages.

After the above electrodeposition, the active matrix substrate is removed from the tub and cured at a temperature of about 453 K for 30 minutes so as to affix the red coloring matter to the selected display electrodes.

Next, green filter layers are electrodeposited on display electrodes $G_{11}, \ldots, G_{1m}, \ldots, G_{nm}$ of active matrix substrate 43. Similarly, after active matrix substrate 43 is immersed into an emulsion containing a solution of polyester-melamine resin and Cu-Phthalocyamines (trade name) dispersed in water, switching circuit 44 supplies DC voltages to address lines and data lines as shown in the second row of Table 1, to select display electrodes $G_{11}, \ldots, G_{1m}, \ldots, G_{nm}$. Then the active matrix substrate is removed from the emulsion and cured so as to affix the green coloring matter to the selected display electrodes. Further, blue filter layers are similarly electrodeposited onto display electrodes $B_{11}, \ldots B_{1m}, \ldots, B_{nm}$ of active matrix substrate 43 by supplying voltages shown in the third row of Table 1, and then the substrate is cured.

Figure 4:
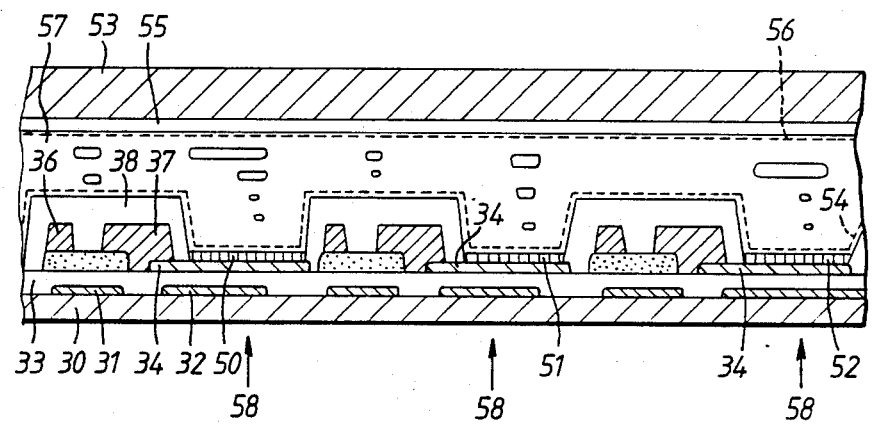
FIG. 4 is a sectional view, in side elevation, of a color matrix-type LCD manufactured by the method of the invention.

Thus, red electrodeposited layer 50, green electrodeposited layer 51 and blue electrodeposited layer 52 are formed on the active matrix substrate, each corresponding to display electrodes 34 as shown in FIG. 4. Then, an orientating layer 54 is formed over layers 50, 51 and 52 and the passivation film. Also, an orientating electrode 55 and another orientating layer 56 are provided on a glass substrate 53 spaced from and facing the active matrix substrate. The intervening space is filled with liquid crystal 57 as a display medium. Since the resulting LCD is of the transparent type, it is illuminated from the back of the active matrix substrate with white backlight 58 including red, green and blue light components. The hue and brightness of transmitted light are controlled by the transmissivity of liquid crystal 57, which is determined by the voltage applied to the display electrodes 34. Thus a color active matrix liquid crystal display device can be manufactured, irrespective of the size of the screen, or the size of the display electrodes, by producing the color by a method in which only those display electrodes which are to be colored are selected using the matrix drive and then the coloring matter is electrodeposited onto these display electrodes. This enables a self aligned color filter to be produced without risk of color misalignment, since the display electrodes themselves provide the colored surface. Thus a color liquid crystal display device of high recognizability or visual quality can be manufactured. It should be noted that the same effect can be obtained even using non-linear devices as the switching elements, and the technique can also be applied to active matrix substrates using metal for the display electrodes in the absence of capacitors.

In the above embodiment, each electrodeposited filter has substantially the same thickness. In that case, it was assumed that the amount of light passing through all filters is the same. This assumption is, however, not always justified, for example, such as when a long, narrow fluorescent lamp is used as a backlight source. The light distribution from the fluorescent lamp usually diminishes toward the edge of the array. Thus when such a backlight source is used, some display electrodes which are located near the edges of the active matrix substrate receives less light than those which are located near the center portion of the active matrix substrate. Such a problem can be solved by providing filters of different thicknesses, according to the next embodiment of this invention.

Figures 5, 7:
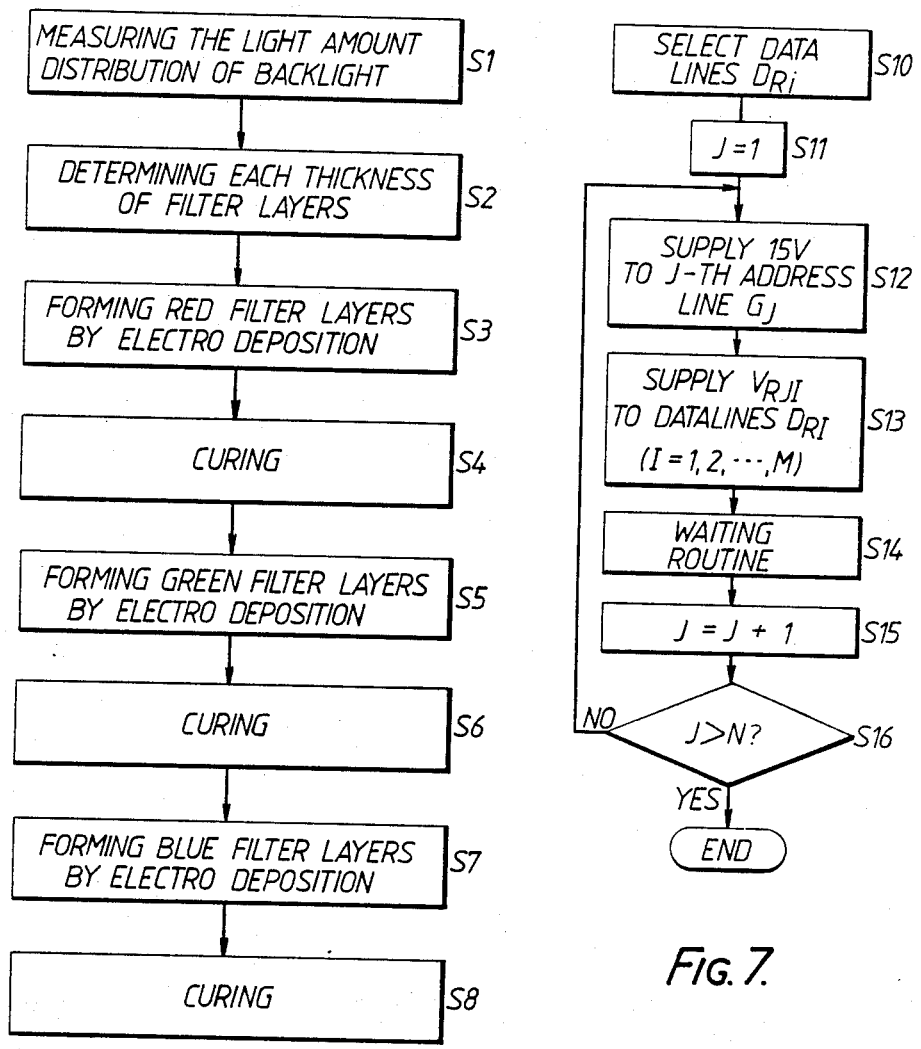
FIG. 5 is a flowchart showing the manufacturing process of another embodiment of the invention.
FIG. 7 is a flowchart showing the operation of the CPU 60 of FIG. 6.

FIG. 5 is a flowchart showing a process for forming electrodeposited filters on an active matrix substrate, similar to the previous embodiment of this invention. First, the light distribution (from the backlight which will be used for illuminating the color LCD) is measured (step S1). Then, the appropriate thickness for each filter is determined in step S2, so as to compensate for variations in the amount of light. Practically, the calculation results in a value for the applied voltage for each display electrode, since the applied voltage mainly defines the thickness of the filter layer to be formed by electrodeposition. For example, when 10 V is applied to the display electrode, the thickness of the filter layer is about 0.8 um, while it is about 2.3 um with an applied voltage of 30 V. Generally, the calculated voltage for peripheral display electrodes will be lower than the voltage for centrally located display electrodes, in order to get substantially the same illumination through each.

Following steps S3 through S8 are basically similar to the first embodiment of the invention. In step S3, red filter layers are formed by electrodeposition, and then the active matrix is cured in step S4. Next, green filter layers are formed by electrodeposition in step S5 followed by curing in step S6. Finally, blue filter layers are formed by electrodeposition in step S7 and cured in step S8. However, steps S3, S5 and S7 are slightly different from the first embodiment in order to form filter layers having different thicknesses. As in the first embodiment, however, each color of filter is electrodeposited in all applicable rows of the matrix before the next color is deposited.

Figure 6:
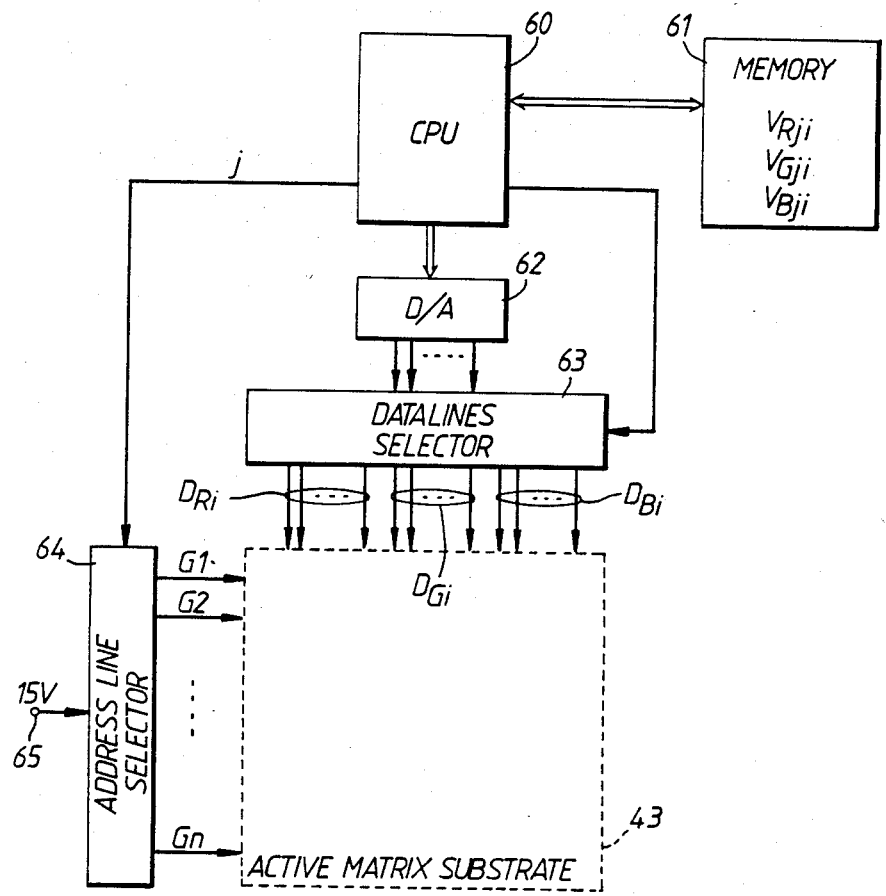
FIG. 6 is a block diagram showing an example of an apparatus which can be used to supply voltages to the active matrix substrate.

FIG. 6 is a block diagram showing a circuit which supplies necessary voltages to address lines and data lines of the active matrix substrate in step S3 of FIG. 5. The circuit includes CPU 60 for controlling the entire circuit, memory 61 for storing control programs by which CPU 60 is operated and also voltage data calculated for step S3 of FIG. 5, digital to analog converter 62, data line selector 63 and address line selector 64.

FIG. 7 is a flowchart indicating the operation of CPU 60 in FIG. 6 for forming red filter layers. After active matrix substrate 43 is immersed in the electrodeposition tub, CPU 60 outputs to data line selector 63 a signal for selecting data lines $D_{Ri}$ (i=1,2, . . . ,m). Data line selector 63 supplies input voltages to data lines $D_{R1}, D_{R2}, \ldots$ . ,$D_{Rm}$. Then CPU 60 initializes an inner counter (not shown) to 1 in step S11.

After initialization, CPU 60 supplies the content of the inner counter to address line selector 64. Address line selector 64 supplies predetermined voltage (15 V) provided from terminal 65 to one of address lines Gj which is designated by the inner counter in step S12. At this stage, CPU 60 reads a set of voltage data $V_{Rj1}, V_{Rj2}, \ldots, V_{Rjm}$ from memory 61, the voltages which should be applied to the display electrodes $R_{j1}, R_{j2}, \ldots, R_{jm}$ located in the j-th row of the matrix. Since the content of the inner counter is 1, a set of voltage data $V_{R11}, V_{R12}, \ldots, V_{R1m}$ is read from memory 61 and supplied to selected data lines $D_{R1}, D_{R2}, \ldots, D_{Rm}$ after conversion to analog voltages by digital to analog converter 62. Referring to FIG. 1, display electrodes 3, 6, . . . 19 of the first row in the matrix are electrodeposited with different voltages at this stage. In step S14 of FIG. 7, CPU 60 waits for a time sufficient to complete the electroposition on each selected display electrode. Then the inner counter is incremented by 1 in step S15, and the content is compared with a value N in step S16. When the content of the inner counter is less than or equal to N, steps S12 through S16 are repeated for the next row of the matrix. When the content of the inner counter is greater than N, that is, after every row of the matrix has been selected, the active matrix substrate 43 is removed from the tub.

Steps S5 through S7 of FIG. 5 are similarly executed except that data line selector 63 selects data lines $D_{Gi}$ and $V_{Bi}$, respectively, and corresponding voltage data $V_{Gji}$ and $V_{Bji}$ stored in memory 61 are used. Thus, the manufactured color active matrix LCD has a selfcompensation for the light distribution of back light.

Although illustrative embodiments of the present invention have been described in detail with reference to the accompanying drawings, it is to be understood that the invention is not limited to those precise embodiments, and that various changes and modifications may be effected therein by one skilled in the art without departing from the scope or spirit of the invention.

I claim:

1. A method of forming a self-aligned filter on an active matrix substrate for a color-matrix-type liquid crystal display device, the active matrix substrate comprising a plurality of picture element units arranged on a substrate in a matrix of rows and columns, each picture element unit including a switching element and a display electrode, said method comprising the steps of:

immersing the active matrix substrate into an emulsion comprising coloring matter of a predetermined color;

applying a voltage to at least one selected display electrode, the voltage being of a value, and applied for a length of time, sufficient to form an electrodeposited filter layer of the predetermined color on the display electrode;

removing the active matrix substrate from the emulsion; and curing the electrodeposited filter layer.

2. The method of claim 1 further comprising the steps of:

immersing the active matrix substrate into an emulsion comprising coloring matter of a second predetermined color;

applying a voltage to at least one second selected display electrode, the voltage being of a value, and applied for a length of time, sufficient to form a second electrodeposited filter layer of the second predetermined color on the second selected display electrode;

removing the active matrix substrate from the emulsion; and curing the second electrodeposited filter layer.

3. The method of claim 1 wherein said active matrix substrate further includes, for each row, an address line connecting all picture elements of the row and, for each column, a data line connecting all picture elements of the column, said step of applying a voltage comprising the steps of:

applying a predetermined address voltage to the address line for each row which includes a selected display electrode; and applying a predetermined data voltage to the data line for each column which includes a selected display electrode, the data voltages being applied through switching elements to the selected display electrodes.

4. The method of claim 2 wherein said active matrix substrate further includes, for each row, an address line connecting all picture elements of the row and, for each column, a data line connecting all picture elements of the column, said step of applying a voltage to at least one selected display electrode comprising the steps of applying a predetermined address voltage to the address line for each row which includes a selected display electrode, and applying a predetermined data voltage to the data line for each column which includes a selected display electrode, the predetermined data voltages being applied through switching elements to the selected display electrodes; and said step of applying a voltage to a second selected display electrode comprising the steps of applying a predetermined address voltage to the address line for each row which includes a second selected display electrode, and applying a predetermined data voltage to the data line for each column which includes a second selected display electrode, the predetermined data voltages being applied through switching elements to the selected display electrodes.

5. The method of claim 3 wherein at least two different predetermined data voltages are applied to the display electrodes, the thickness of the electrodeposited filter layers being directly related to the values of the applied data voltages.

6. The method of claim 4 wherein at least two different predetermined data voltages are applied to the display electrodes, the thickness of the electrodeposited filter layers being directly related to the values of the applied data voltages.

7. A method of manufacturing a color-matrix-type liquid crystal display device, said method comprising the steps of:

forming an active matrix substrate having a plurality of picture element units arranged in a matrix of rows and columns, each picture element unit including a switching element and a display electrode;

immersing the active matrix substrate into an emulsion comprising coloring matter of a predetermined color;

applying a voltage to at least one selected display electrode, the voltage being of a value, and applied for a length of time, sufficient to form an electrodeposited filter layer of the predetermined color on the display electrode;

removing the active matrix substrate from the emulsion; and curing the electrodeposited filter layer.

8. A method of manufacturing a color-matrix-type liquid crystal display device having an active matrix substrate formed with a plurality of picture element units arranged in a matrix of rows and columns, each picture element unit including a transparent display electrode and a corresponding switching element, said method comprising the steps of:

storing voltage data corresponding to a plurality of the display electrodes;

immersing the active matrix substrate into an emulsion containing coloring matter;

applying to selected ones of the plurality of display electrodes the voltages represented by the stored voltage data by selectively controlling the corresponding switching elements, the voltages being applied for a predetermined period sufficient to form on the selected display electrodes an electrodeposited filter layer whose thickness is directly related to the value of the applied voltage;

removing the active matrix substrate from the emulsion; and curing the electrodeposited filter layer.

9. A method of manufacturing a color-matrix-type liquid crystal display device having an active matrix substrate formed with a plurality of picture element units arranged in a matrix of rows and columns, each picture element unit including a transparent display electrode and a corresponding switching element, said method comprising the steps of:

storing voltage data corresponding to a plurality of the display electrodes, each voltage datum representing an individual thickness of a filter layer to be electrodeposited on the corresponding display electrode;

immersing the active matrix substrate into an emulsion containing coloring matter;

applying to selected ones of the plurality of display electrodes the voltages represented by the stored voltage data by selectively controlling the corresponding switching elements, the voltages being applied for a predetermined time period sufficient to form on the selected display electrodes an electrodeposited filter layer whose thickness is related to the value of the applied voltage;

removing the active matrix substrate from the emulsion; and curing the electrodeposited filter layer.

10. The method of claim 8 further comprising the steps of:

immersing the active matrix substrate into an emulsion comprising coloring matter of a second predetermined color;

applying a voltage to at least one second selected display electrode, the voltage being of a value, and applied for a length of time, sufficient to form a second electrodeposited filter layer of the second predetermined color on the second selected display electrode;

removing the active matrix substrate from the emulsion; and curing the second electrodeposited filter layer.

11. The method of claim 8 wherein said active matrix substrate further includes, for each row, an address line connecting all picture elements of the row and, for each column, a data line connecting all picture elements of the column, said step of applying said voltages comprising the steps of:

applying a predetermined address voltage to the address line for each row which includes a selected display electrode; and applying a predetermined voltage data to the data line for each column which includes a selected display electrode, the voltage data being applied through switching elements to the selected display electrodes.

12. The method of claim 10 wherein said active matrix substrate further includes, for each row, an address line connecting all picture elements of the row and, for each column, a data line connecting all picture elements of the column;

said step of applying a voltage to at least one selected display electrode comprising the steps of applying a predetermined address voltage to the address line for each row which includes a selected display electrode, and applying a predetermined voltage data to the data line for each column which includes a selected display electrode, the predetermined voltage data being applied through switching elements to the selected display electrodes; and said step of applying a voltage to a second selected display electrode comprising the steps of applying a predetermined address voltage to the address line for each row which includes a second selected display electrode, and applying a predetermined voltage data to the data line for each column which includes a second selected display electrode, the predetermined voltage data being applied through switching elements to the selected display electrodes.

13. The method of claim 11 wherein a least two different predetermined voltage data are applied to the display electrodes, the thickness of the electrodeposited filter layers being directly related to the values of the applied voltage data.

14. The method of claim 12 wherein at least two different predetermined voltage data are applied to the display electrodes, the thickness of the electrodeposited filter layers being directly related to the values of the applied voltage data.

15. The method of claim 9 further comprising the steps of:

immersing the active matrix substrate into an emulsion comprising coloring matter of a second predetermined color;

applying a voltage to at least one second selected display electrode, the voltage being of a value, and applied for a length of time, sufficient to form a second electrodeposited filter layer of the second predetermined color on the second selected display electrode;

removing the active matrix substrate from the emulsion; and curing the second electrodeposited filter layer.

16. The method of claim 9 wherein said active matrix substrate further includes, for each row, an address line connecting all picture elements of the row and, for each column, a data line connecting all picture elements of the column, said step of applying said voltages comprising the steps of:

applying a predetermined address voltage to the address line for each row which includes a selected display electrode; and applying a predetermined voltage data to the data line for each column which includes a selected display electrode, the voltage data being applied through switching elements to the selected display electrodes.

17. The method of claim 15 wherein said active matrix substrate furfther includes, for each row, an address line connecting all picture elements of the row and, for each column, a data line connecting all picture elements of the column;

said step of applying a voltage to at least one selected display electrode comprising the steps of applying a predetermined address voltage to the address line for each row which includes a selected display electrode, the predetermined voltage data being applied through switching elements to the selected display electrodes; and said step of applying a voltage to a second selected display electrode comprising the steps of applying a predetermined address voltage to the address line for each row which includes a second selected display electrode, and applying a predetermined voltage data to the data line for each column which includes a second selected display electrode, the predetermined voltage data being applied through switching elements to the selected display electrodes.

18. The method of claim 16 wherein at least two different predetermined voltage data are applied to the display electrodes, the thickness of the electrodeposited filter layers being directly related to the values of the applied voltage data.

19. The method of claim 17 wherein at least two different predetermined voltage data are applied to the display electrodes, the thickness of the electrodeposited filter layers being directly related to the values of the applied voltage data.

* * * * *